US012621097B2

(12) United States Patent
Shabara et al.

(10) Patent No.: US 12,621,097 B2
(45) Date of Patent: May 5, 2026

(54) DYNAMIC DMRS PATTERN SWITCHING

(71) Applicant: MEDIATEK INC., Hsinchu (TW)

(72) Inventors: Yahia Ahmed Mahmoud Mahmoud Shabara, San Jose, CA (US); Parisa Cheraghi, San Jose, CA (US)

(73) Assignee: MEDIATEK INC., Hsinchu (TW)

( * ) Notice: Subject to any disclaimer, the term of this patent is extended or adjusted under 35 U.S.C. 154(b) by 330 days.

(21) Appl. No.: 18/228,803

(22) Filed: Aug. 1, 2023

(65) Prior Publication Data

US 2024/0048306 A1 Feb. 8, 2024

Related U.S. Application Data

(60) Provisional application No. 63/370,679, filed on Aug. 8, 2022.

(51) Int. Cl.
H04L 5/00 (2006.01)
(52) U.S. Cl.
CPC .......... H04L 5/0048 (2013.01); H04L 5/0007 (2013.01)
(58) Field of Classification Search
CPC ... H04L 5/0048; H04L 5/0007; H04L 5/0051; H04L 5/0055; H04W 76/27
See application file for complete search history.

(56) References Cited

U.S. PATENT DOCUMENTS

| | | | | |
|---|---|---|---|---|
| 2017/0013557 A1* | 1/2017 | Koc | ........................... | H04J 3/00 |
| 2019/0013910 A1* | 1/2019 | Zhang | ................... | H04L 1/1896 |
| 2019/0149365 A1* | 5/2019 | Chatterjee | ............. | H04W 76/11 |
| | | | | 370/329 |
| 2021/0344462 A1* | 11/2021 | Jiao | ........................ | H04L 5/0051 |
| 2023/0179460 A1* | 6/2023 | Tian | ...................... | H04L 5/0051 |
| | | | | 370/329 |
| 2023/0231683 A1* | 7/2023 | Ali | ........................ | H04L 5/0051 |
| | | | | 370/329 |
| 2024/0022371 A1* | 1/2024 | Kumar | ................... | H04L 5/0051 |
| 2024/0163894 A1* | 5/2024 | Xiong | ................... | H04L 1/1854 |
| 2025/0056556 A1* | 2/2025 | Jacobsson | ........... | H04W 72/231 |
| 2025/0202651 A1* | 6/2025 | Zhang | ............... | H04W 72/1268 |
| 2025/0254709 A1* | 8/2025 | Zhao | ................... | H04B 7/0695 |

* cited by examiner

*Primary Examiner* — Sharmin Chowdhury
(74) *Attorney, Agent, or Firm* — troutman pepper locke; Tim Tingkang Xia, Esq.

(57) ABSTRACT

In an aspect of the disclosure, a method, a computer-readable medium, and an apparatus are provided. The apparatus may be a UE. In certain configurations, the UE receives a message having Demodulation Reference Signal (DMRS) switching bits that indicate which DMRS pattern is being used of either of a first DMRS pattern or a second DMRS pattern. The UE determines the DMRS pattern being used from the DMRS switching bits. The UE applies the determined DMRS pattern being used to processing of uplink and downlink channels.

20 Claims, 16 Drawing Sheets

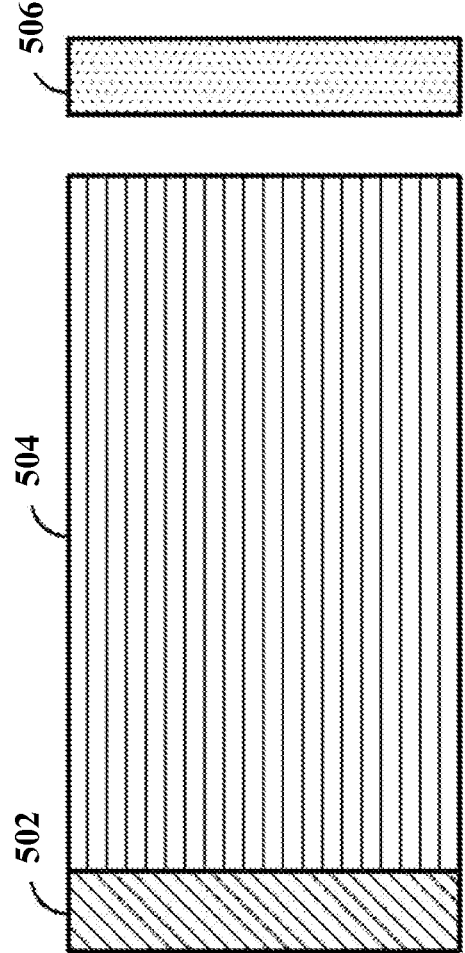
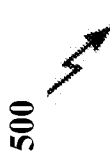
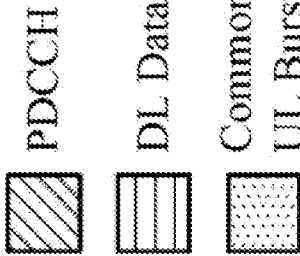
PDCCH
DL Data
Common
UL Burst
500
FIG. 5

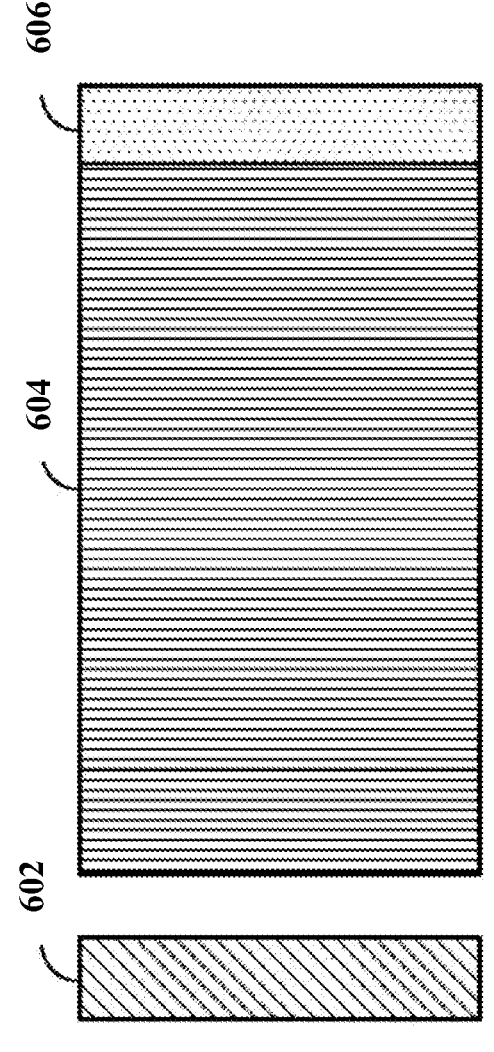
602
604
606
600
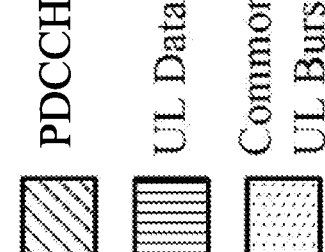
PDCCH
UL Data
Common
UL Burst
FIG. 6

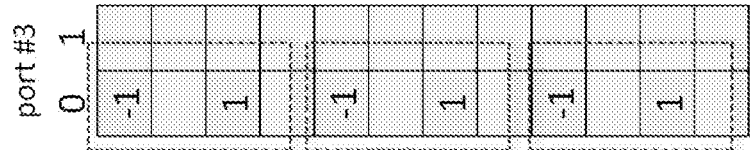
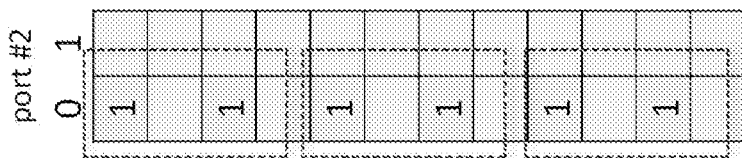
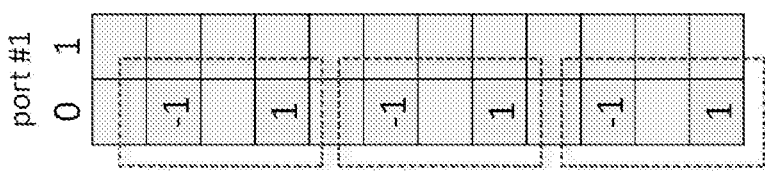
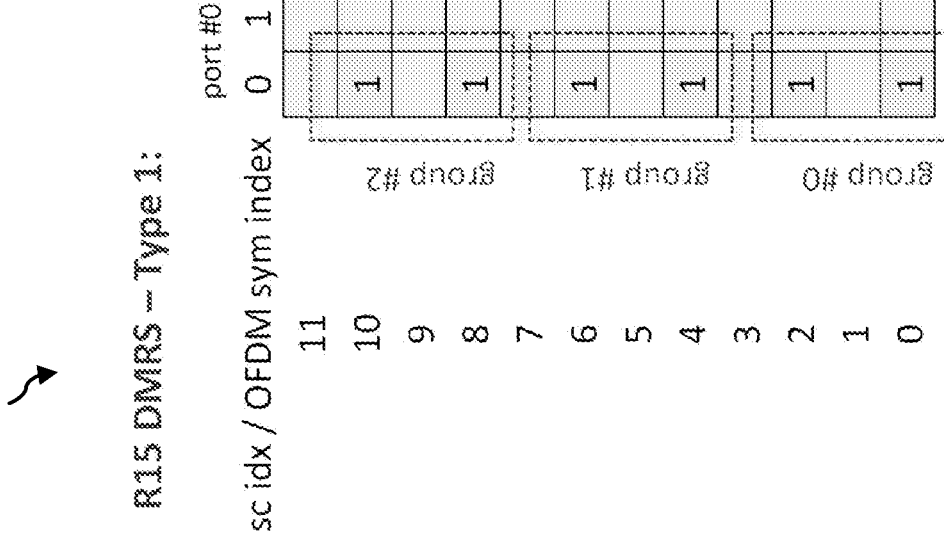
FIG. 8A

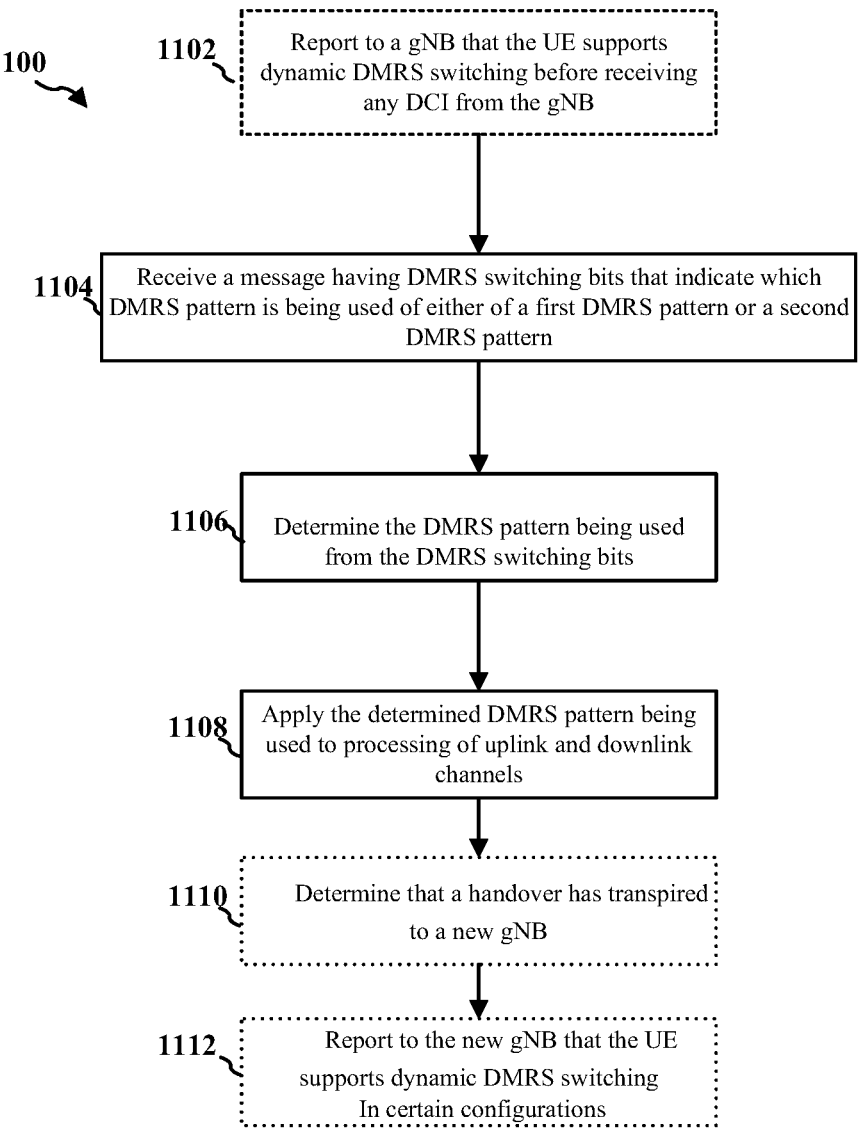

1100

1102 Report to a gNB that the UE supports dynamic DMRS switching before receiving any DCI from the gNB 1104 Receive a message having DMRS switching bits that indicate which DMRS pattern is being used of either of a first DMRS pattern or a second DMRS pattern 1106 Determine the DMRS pattern being used from the DMRS switching bits 1108 Apply the determined DMRS pattern being used to processing of uplink and downlink channels 1110 Determine that a handover has transpired to a new gNB 1112 Report to the new gNB that the UE supports dynamic DMRS switching In certain configurations

FIG. 11

DYNAMIC DMRS PATTERN SWITCHING

CROSS-REFERENCE TO RELATED APPLICATION(S)

This application claims the benefit of U.S. Provisional Application Ser. No. 63/370,679, entitled "DYNAMIC DMRS PATTERN SWITCHING", and filed on Aug. 8, 2022, which is expressly incorporated by reference herein in its entirety.

BACKGROUND

Field

The present disclosure relates generally to communication systems, and more particularly, to techniques of adapting DMRS patterns to dynamic conditions.

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. In certain configurations, the UE receives a message having Demodulation Reference Signal (DMRS) switching bits that indicate which DMRS pattern is being used of either of a first DMRS pattern or a second DMRS pattern. The UE determines the DMRS pattern being used from the DMRS switching bits. The UE applies the determined DMRS pattern being used to processing of uplink and downlink channels.

In certain configurations the UE reports to the gNB that the UE supports dynamic DMRS switching before receiving any DCI from the gNB. In certain configurations the UE determines that a handover has transpired to a new gNB. In certain configurations, the UE reports to the new gNB that the UE supports dynamic DMRS switching.

In certain configurations, the first DMRS pattern has a first length FD-OCC and the second DMRS pattern has a second length frequency domain (FD)-orthogonal cover code (OCC) that is different than the first length FD-OCC. In certain configurations, the first DMRS pattern is R15 DMRS with length-2 FD-OCC and the second DMRS pattern is R18 DMRS with length-4 FD-OCC. In certain configurations, the DMRS switching bits include one or more uplink bits that indicate an uplink DMRS pattern used for the uplink channel and one or more downlink bits that indicate a downlink DMRS pattern used for the downlink channel, and the determining the DMRS pattern includes determining each of the uplink DMRS pattern and the downlink DMRS pattern from the DMRS switching bits, and applying the determined DMRS pattern includes applying the determined uplink DMRS pattern to the uplink channel and the determined downlink DMRS pattern to the downlink channel, wherein the uplink DMRS pattern and downlink DMRS pattern are be different. In certain configurations, the DMRS switching bits are allocated in DCI and the message having the DMRS switching bits is received via the DCI from a gNB. In certain configurations, the DMRS switching bits are allocated in RRC information and the message having the DMRS switching bits is received via the RRC information. In certain configurations, the reporting is performed using RRC.

In an aspect of the disclosure, a method, a computer-readable medium, and an apparatus are provided. The apparatus may be a gNB. The gNB transmits to a UE a message having the DMRS switching bits that indicate which DMRS pattern is being used of either of a first DMRS pattern or a second DMRS pattern. The gNB applies the indicated DMRS pattern being used to processing of uplink and downlink channels.

In certain configurations, the gNB receives a report from the UE that the UE supports dynamic DMRS switching, and the gNB only sends the message having DMRS switching bits to the UE after receiving the report. In certain configurations, the gNB allocates bits in DCI messaging for the DMRS switching bits.

In certain configurations, the first DMRS pattern has a first length FD-OCC and the second DMRS pattern has a second length frequency domain (FD)-orthogonal cover code (OCC) that is different than the first length FD-OCC. In certain configurations, the first DMRS pattern is R15 DMRS with length-2 FD-OCC and the second DMRS pattern is R18 DMRS with length-4 FD-OCC. In certain configurations, the DMRS switching bits include one or more uplink bits that indicate an uplink DMRS pattern used for the uplink channel and one or more downlink bits that indicate a downlink DMRS pattern used for the downlink channel, and the determining the DMRS pattern includes determining each of the uplink DMRS pattern and the downlink DMRS pattern from the DMRS switching bits, and applying the determined DMRS pattern includes applying the determined uplink DMRS pattern to the uplink channel and the determined downlink DMRS pattern to the downlink channel, wherein the uplink DMRS pattern and downlink DMRS pattern are be different.

In certain configurations, the network conditions include network loading and channel conditions and the evaluation includes optimization network performance based on the network conditions. In certain conditions, the report is received via a RRC communication.

In certain configurations, the DMRS switching bits are transmitted via DCI when they are sent. In certain configurations, the DMRS switching bits are transmitted via RRC when they are sent.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5 is a diagram showing an example of a DL-centric slot.

FIG. 6 is a diagram showing an example of an UL-centric slot.

FIGS. 8A-8C are diagrams illustrating port configurations for types 1 and 2 of each of DMRS release 15 and DMRS release 18.

FIG. 11 is a flow chart of a method (process) for wireless communication performed by a UE.

DETAILED DESCRIPTION

Figure 1:
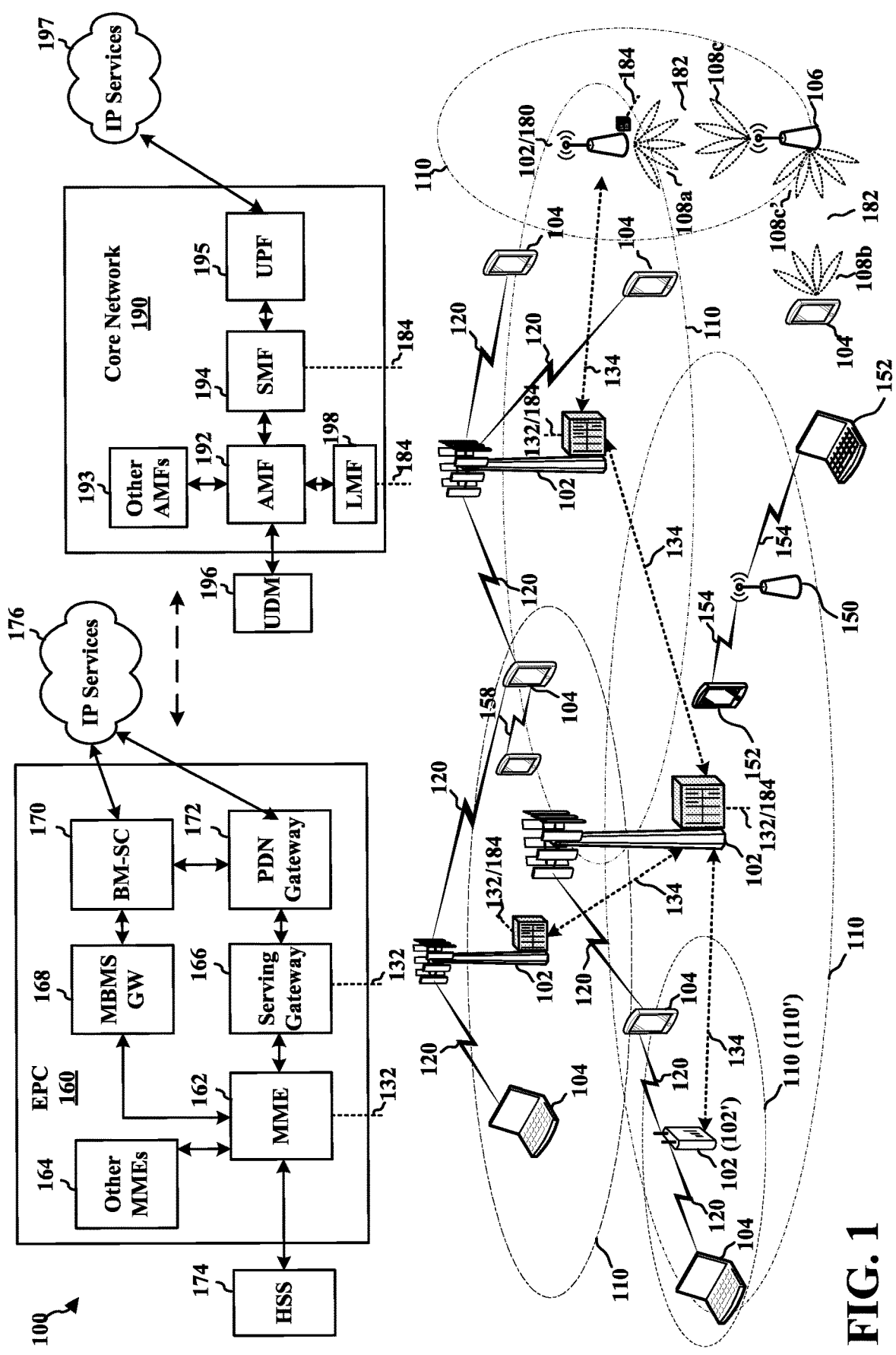
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5GNR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to 7 MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 108a. The UE 104 may receive the beamformed signal from the base station 180 in one or more receive directions 108b. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a location management function (LMF) 198, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the SMF 194 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may reference 5G New Radio (NR), the present disclosure may be applicable to other similar areas, such as LTE, LTE-Advanced (LTE-A), Code Division Multiple Access (CDMA), Global System for Mobile communications (GSM), or other wireless/radio access technologies, including possible future technologies, e.g., 6G and possible successors.

Figure 2:
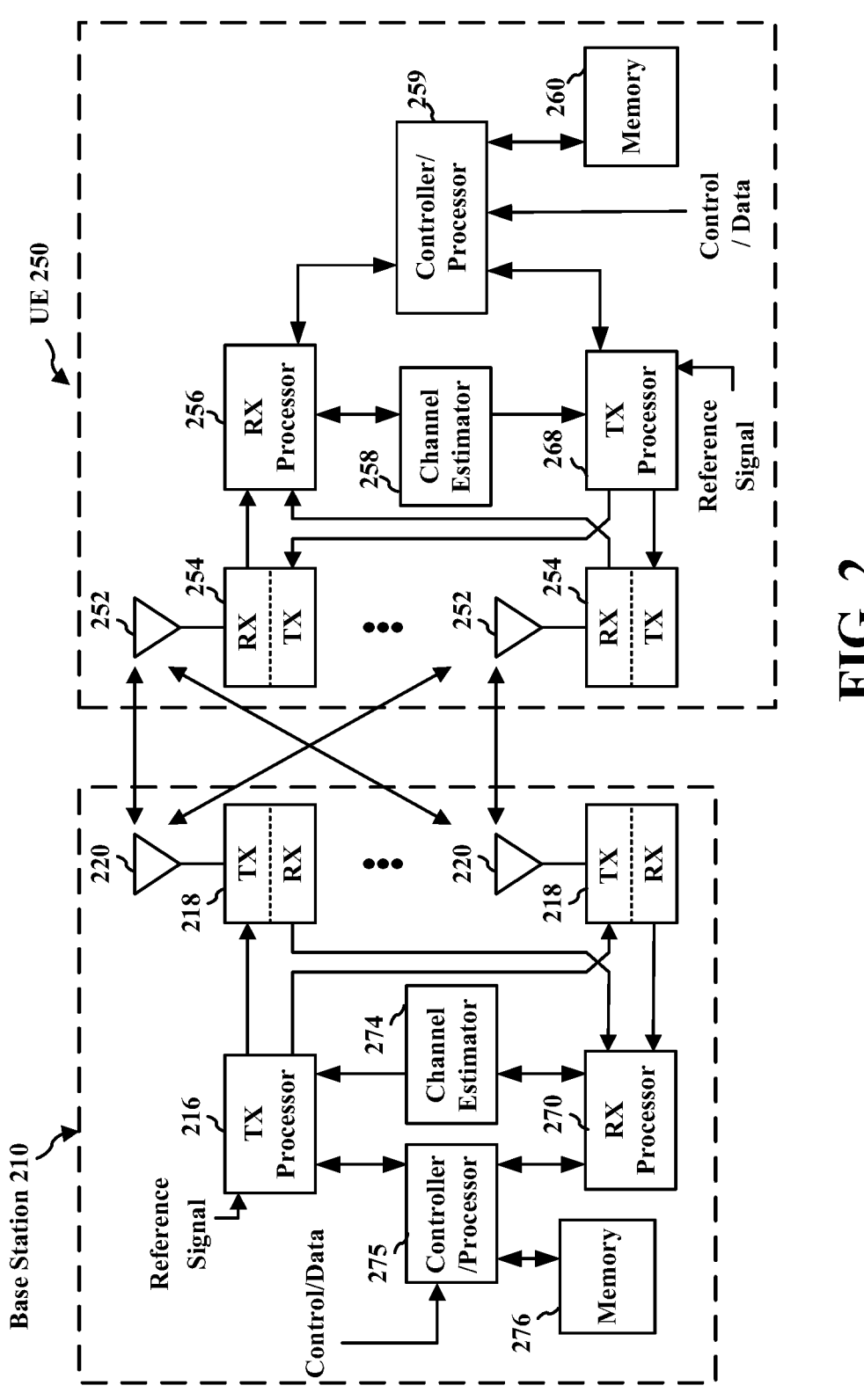
FIG. 2 is a diagram illustrating a base station in communication with a UE in an access network.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service.

A single component carrier bandwidth of 100 MHz may be supported. In one example, NR resource blocks (RBs) may span 12 sub-carriers with a sub-carrier bandwidth of 60 kHz over a 0.25 ms duration or a bandwidth of 30 kHz over a 0.5 ms duration (similarly, 50 MHz BW for 15 kHz SCS over a 1 ms duration). Each radio frame may consist of 10 subframes (10, 20, 40 or 80 NR slots) with a length of 10 ms. Each slot may indicate a link direction (i.e., DL or UL) for data transmission and the link direction for each slot may be dynamically switched. Each slot may include DL/UL data as well as DL/UL control data. UL and DL slots for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
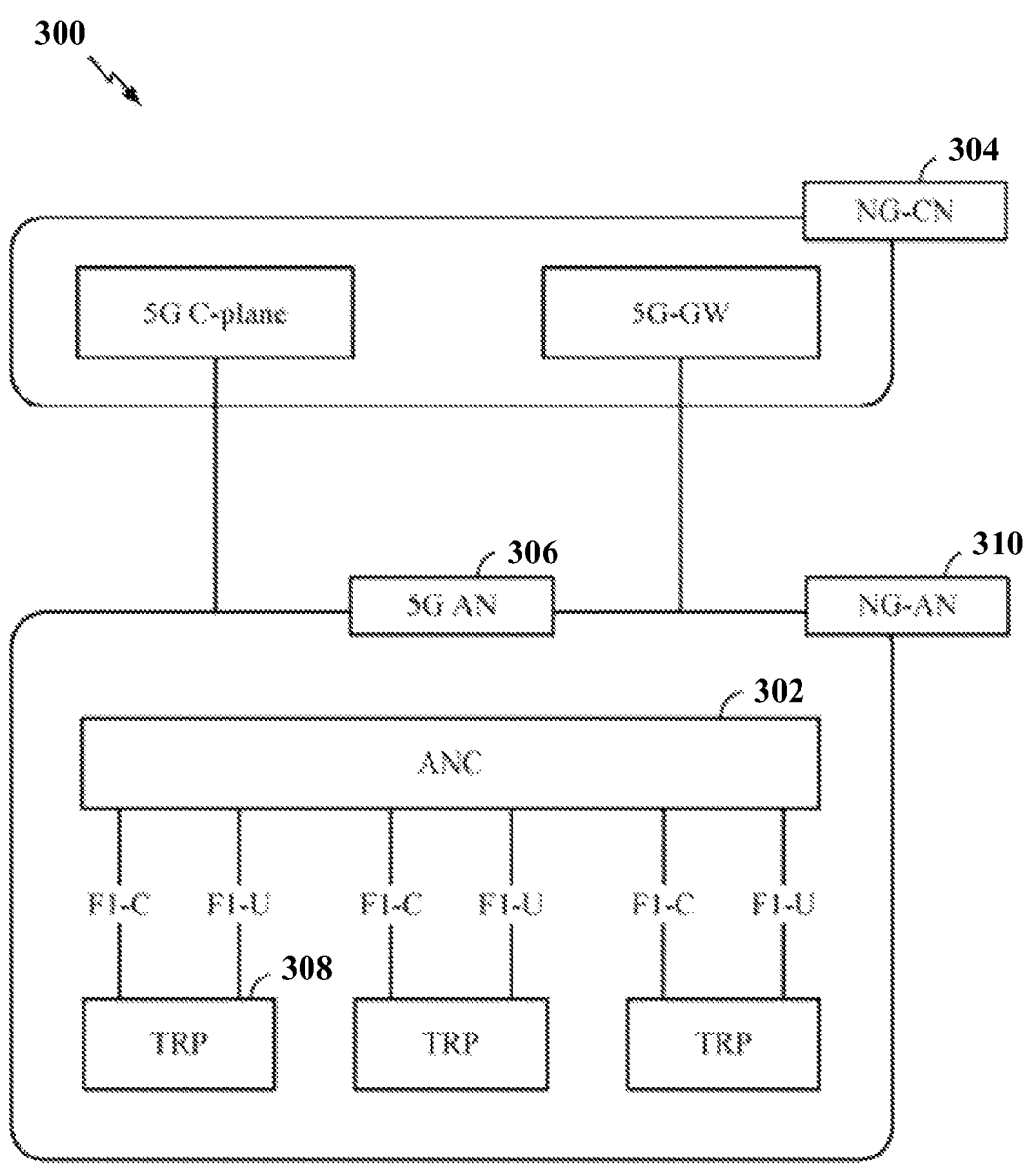
FIG. 3 illustrates an example logical architecture of a distributed access network.

FIG. 3 illustrates an example logical architecture of a distributed RAN 300, according to aspects of the present disclosure. A 5G access node 306 may include an access node controller (ANC) 302. The ANC may be a central unit (CU) of the distributed RAN. The backhaul interface to the next generation core network (NG-CN) 304 may terminate at the ANC. The backhaul interface to neighboring next generation access nodes (NG-ANs) 310 may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific ANC deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
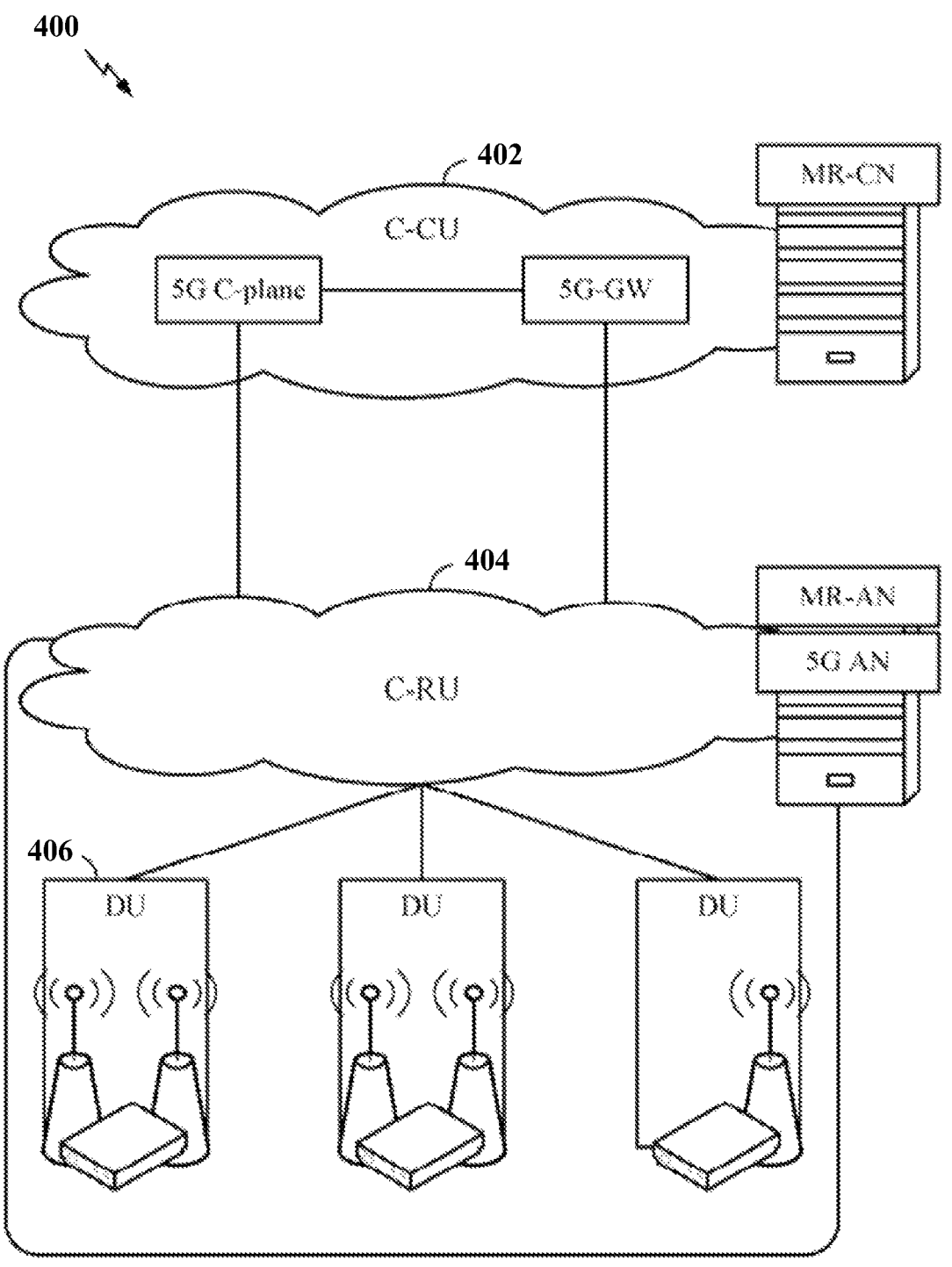
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

FIG. 5 is a diagram 500 showing an example of a DL-centric slot. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric slot may also include a common UL portion 506. The common UL portion 506 may sometimes be referred to as an UL burst, a common UL burst, and/or various other suitable terms. The common UL portion 506 may include feedback information corresponding to various other portions of the DL-centric slot. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric slot and alternative structures having similar features may exist without necessarily deviating from the aspects described herein.

FIG. 6 is a diagram 600 showing an example of an UL-centric slot. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL data portion 604. The UL data portion 604 may sometimes be referred to as the pay load of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric slot may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric slot and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UET) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Figure 7:
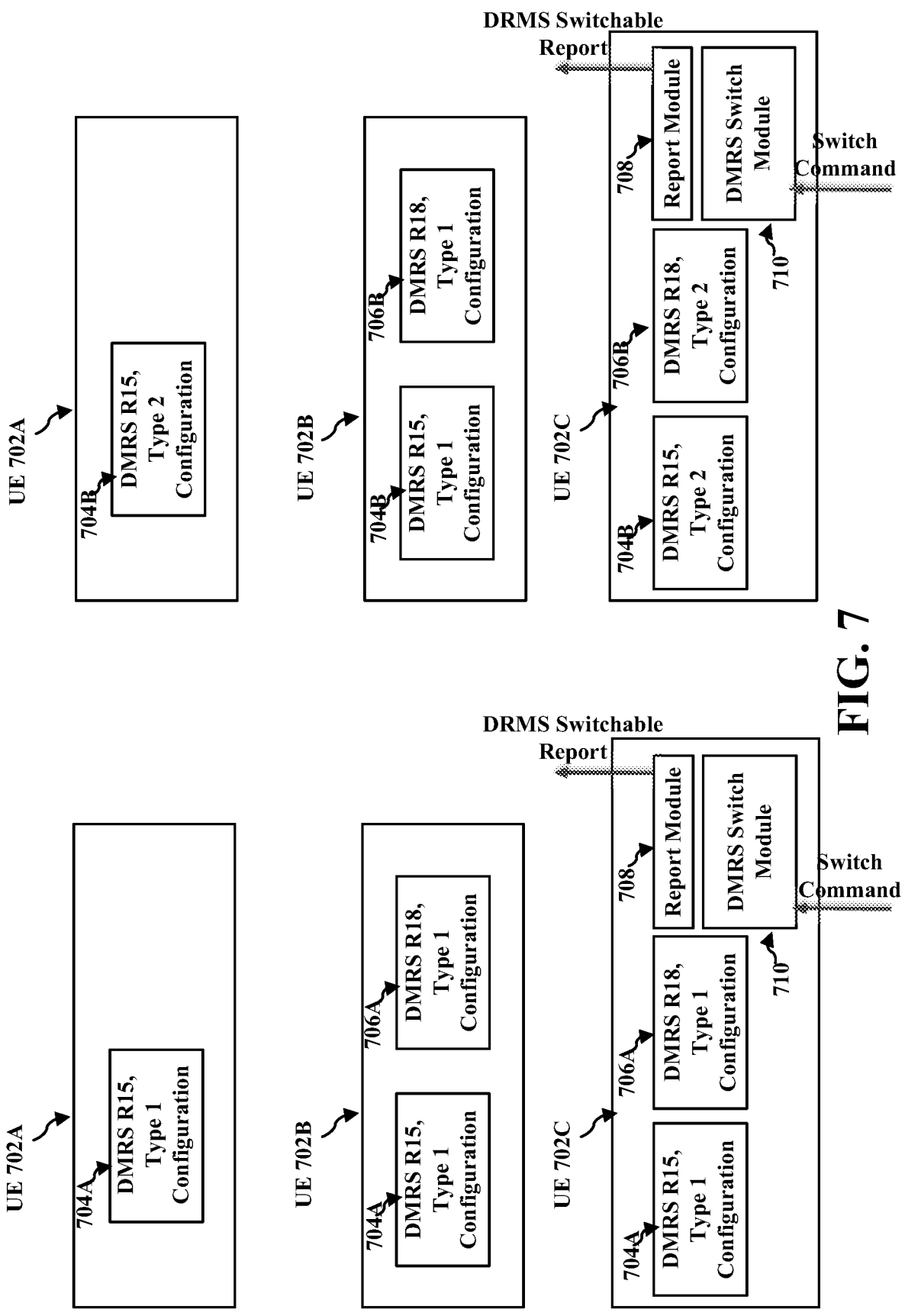
FIG. 7 is a diagram illustrating several different example versions of UEs.

FIG. 7 is a diagram 700 illustrating several different example versions of 5G capable UEs, including UEs 702A, 702B, and 702C (referred to collectively as UEs 702). Each of UEs 702A, 702B, and 702C have at least one Demodulation Reference Signal (DMRS) configuration, including a one of a DMRS R15, Type 1 configuration 704A and a DMRS R15, Type 2 configuration 704B (referred to generally as DMRS R15 configuration 704) and/or one of a DMRS R18, Type 1 configuration 706A and a DMRS R18, Type 2 configuration 706B (referred to generally as DMRS R18).

It is noted that due to DMRS type 1 and type 2 being non-orthogonal and the potential of interference with one another, DMRS type 1 and type 2 are typically transmitted through different ports.]

UEs 702A are configured with a legacy release 15-17 of DMRS, referred to as DMRS R15. DMRS R15 can have a type 1 that supports 8 ports or a type 2 that supports 12 ports. Two example UEs 702A are shown that have different DMRS configurations. A first UE 702A having the DMRS R15, Type 1 configuration 704A, and the second UE 702A having the DMRS R15, Type 2 configuration 704B.

Two example UEs 702B are shown that have different DMRS configurations. UEs 702B are configured with DMRS R15 and DMRS R18. In one configuration shown, DMRS R15 and DMRS R18 have type 1 that supports 8 and 16 ports, respectively. In another configuration shown, DMRS R15 and DMRS R18 have type 2 that supports 12 and 24 ports, respectively. This example is based on current design in which UEs capable of R18 DMRS are required to also support R15 DMRS. It is recognized that this type of restriction could be removed for future generations. Double the number of ports are supported for DMRS R18 relative the number of ports supported by the same type for DMRS R15. Two UEs 702B are shown, a first UE 702B having DMRS R15, Type 1 configuration 704A and DMRS R18, Type 1 configuration 706A, and the second UE 702B having DMRS R15, Type 2 configuration 704B DMRS R18, Type 2 configuration 706B.

DMRS is a type of 5G NR physical layer signal that helps a receiver estimate and equalize a channel, such as any of the physical uplink and downlink channels, the random access channel, logical channels, and transport channels. DMRS is multiplexed with data in both uplink and downlink channels (PUSCH and PDSCH, respectively) and is precoded using a same data precoder.

The total number of ports required to be supported by DMRS depends on the total number of layers simultaneously served by a gNB for all UEs in a MU-MIMO setting.

To allow high quality channel estimation, the DMRS associated with different layers (ports) are orthogonal. The DMRS orthogonality is achieved using time, frequency and code multiplexing. The number of available data ports (i.e., layers) is thus limited by the number of orthogonal DMRS ports supported. An increase in the number of DMRS R18 ports relative to DMRS R15 ports (double) causes a degradation in performance of channel estimation. This degradation can lead to decreased link quality and increased Block Error Rate (BLER).

Although UE 702B can support an increased number of DMRS R18 ports, this may not be needed under certain network conditions, such as when the total number of layers simultaneously served by a gNB is low. In such a scenario, UE 702B's DMRS R18 pattern usage would result in disadvantages without providing available advantages.

Accordingly, UE 702C is provided with both DMRS R15 configuration 704 (704A or 704B) and DMRS R18 configuration 706 (706A or 706B), and can switch between using DMRS R15 configuration 704 and DMRS R18 configuration 706. UE 702C further includes a report module 708 and a DMRS switch module 710. Report module 708 is configured to send a DMRS switchable report to a connected gNB to report that UE 702C has both DMRS R15 configuration 704 and DMRS R18 configuration 706 and can dynamically switch between using DMRS R15 configuration 704 and DMRS R18 configuration 706. DMRS switch module 710 is configured to receive switch commands and switch between usage of DMRS R15 configuration 704 and DMRS R18 configuration 706.

Thus, the gNB can monitor network conditions and select to use DMRS R15 or DMRS R18 based on the network conditions. Each time the gNB decides to switch between DMRS R15 or DMRS R18, it can send a switch command to UE 702C. Both the gNB and UE 702C will change from DMRS R15 to DMRS R18 or from DMRS R18 to DMRS R15. This shall allow link quality of the network to improve in response to network conditions, such as loading conditions and channel conditions.

One example channel condition is frequency-selectivity. The higher the frequency selectivity, the more interference that is created across DMRS ports with frequency-domain code division multiplexing (FD-CDM). In such a case, the shorter CDM length in frequency, the better. Under this example channel condition, an R15 DMRS pattern (which has length two FD-CDM) is more suitable for a channel condition with high frequency-selectivity.

Loading as used in this context refers to a number of served layers in MU-MIMO. Thus, when, for example, loading is light (meaning the number of served layers in MU-MIMO is low), the gNB uses DMRS R15 and commands UE 702C to use DMRS R15 configuration 704. When loading is heavy (meaning the number of served layers in MU-MIMO is high), the gNB uses DMRS R18 and commands UE 702C to use DMRS R18 configuration 706.

Two example UEs 702C are shown that have different DMRS configurations. In one configuration shown, DMRS R15 and DMRS R18 have type 1 and in the other configuration shown, DMRS R15 and DMRS R18 have type 2.

Figure 8B:
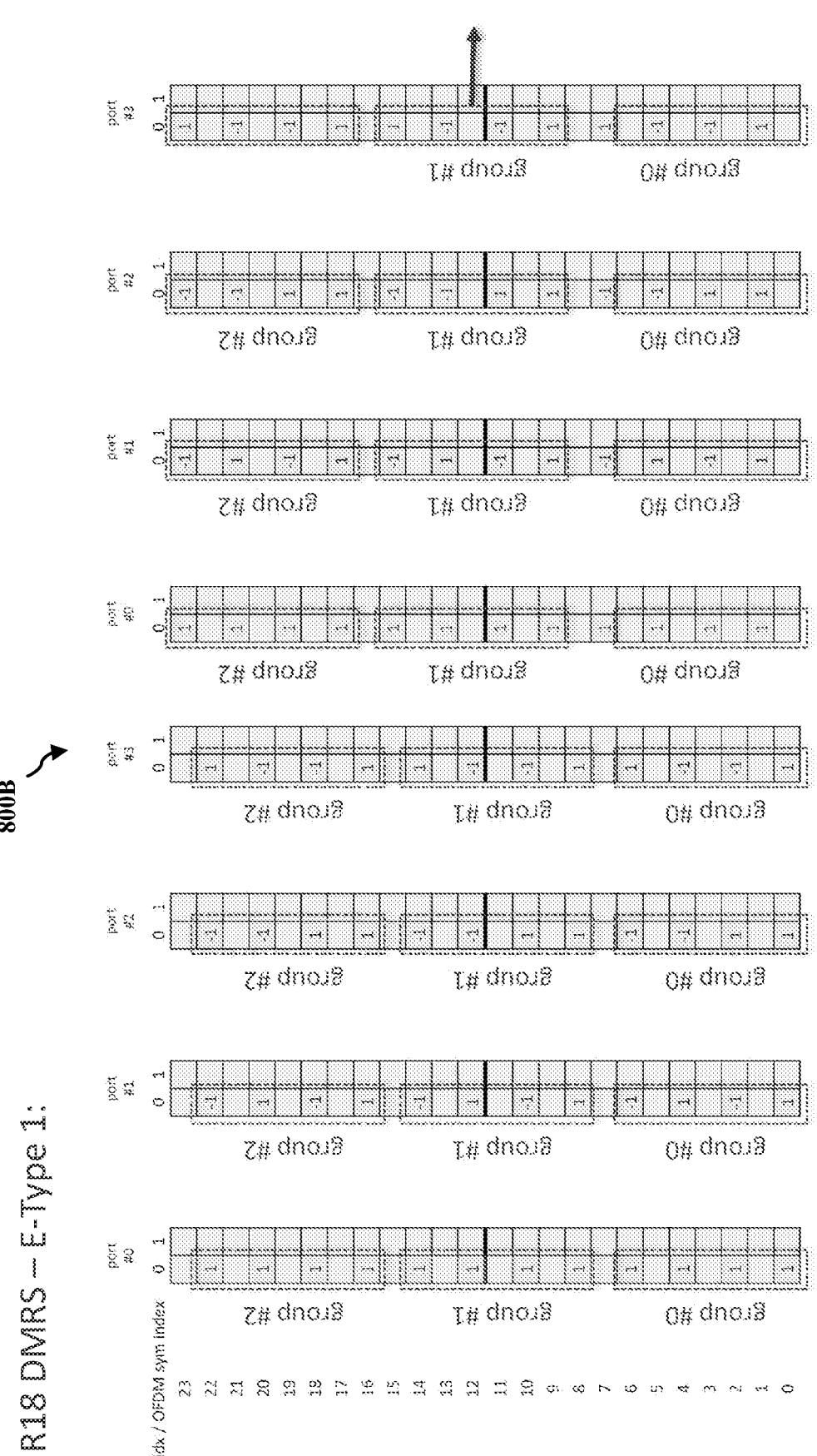
Figure 8C:
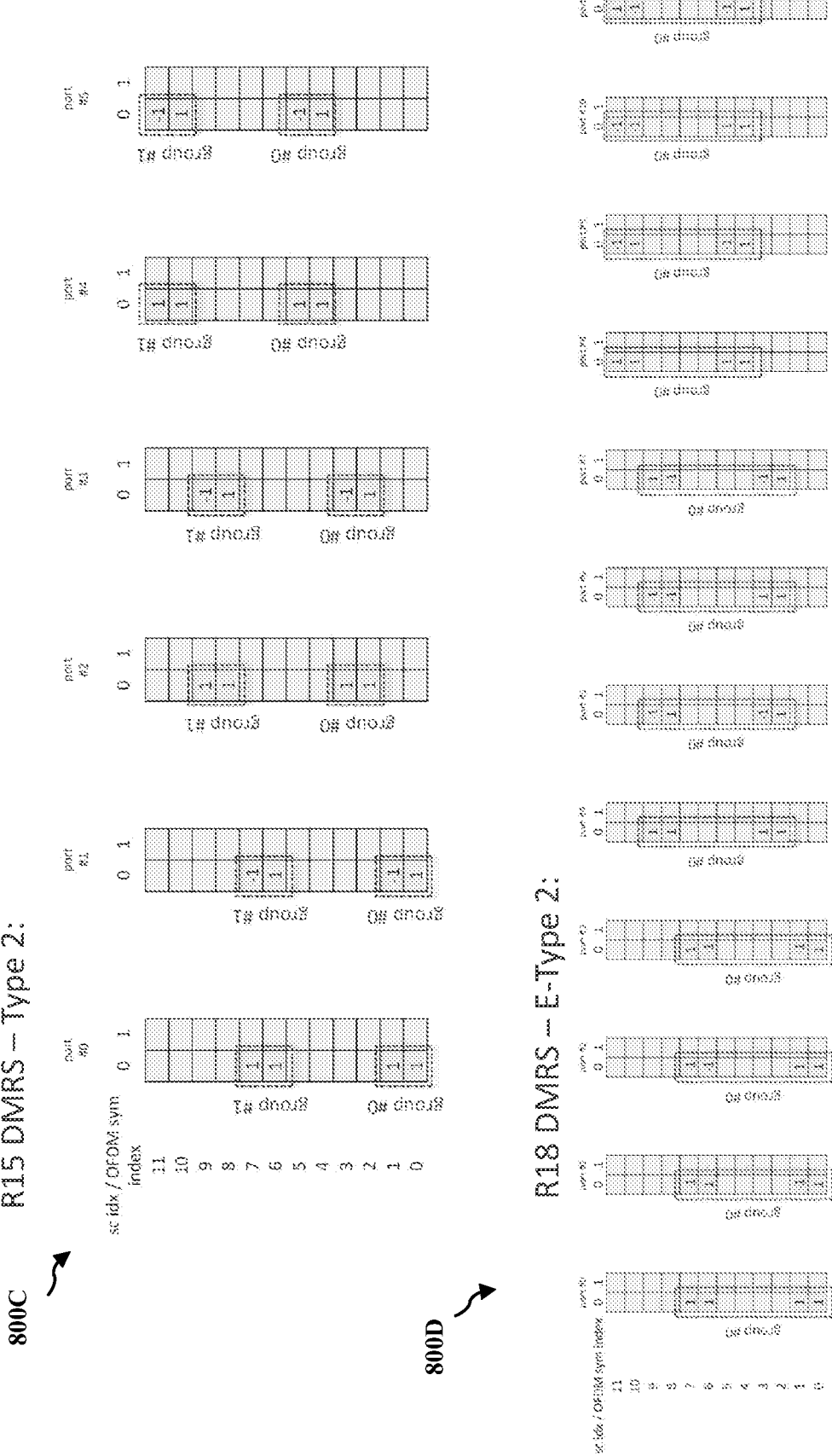

With reference to FIGS. 8A-8C, diagrams are provided that illustrate example port configurations for types 1 and 2 of each of DMRS release 15 and DMRS release 18. FIG. 8A is a diagram illustrating an example port configuration 800A for DMRS 15, Type 1. FIG. 8B is a diagram illustrating an example port configuration 800B for DMRS 18, Type 1. In accordance with the disclosure, a gNB can decide to switch between port configuration 800A and port configuration 800B by changing the DMRS configuration used by the gNB and by sending a switch command to the UE 702Cs (shown in FIG. 7) served by the gNB that have DMRS switching capabilities.

FIG. 8C is a diagram illustrating an example port configuration 800C for DMRS 15, Type 2 and port configuration 800D for DMRS 18, Type 2. In accordance with the disclosure, a gNB can decide to switch between port configuration 800C and port configuration 800D by changing the DMRS configuration used by the gNB and by sending a switch command to the UE 702Cs (shown in FIG. 7) served by the gNB that have DMRS switching capabilities.

Figure 9:
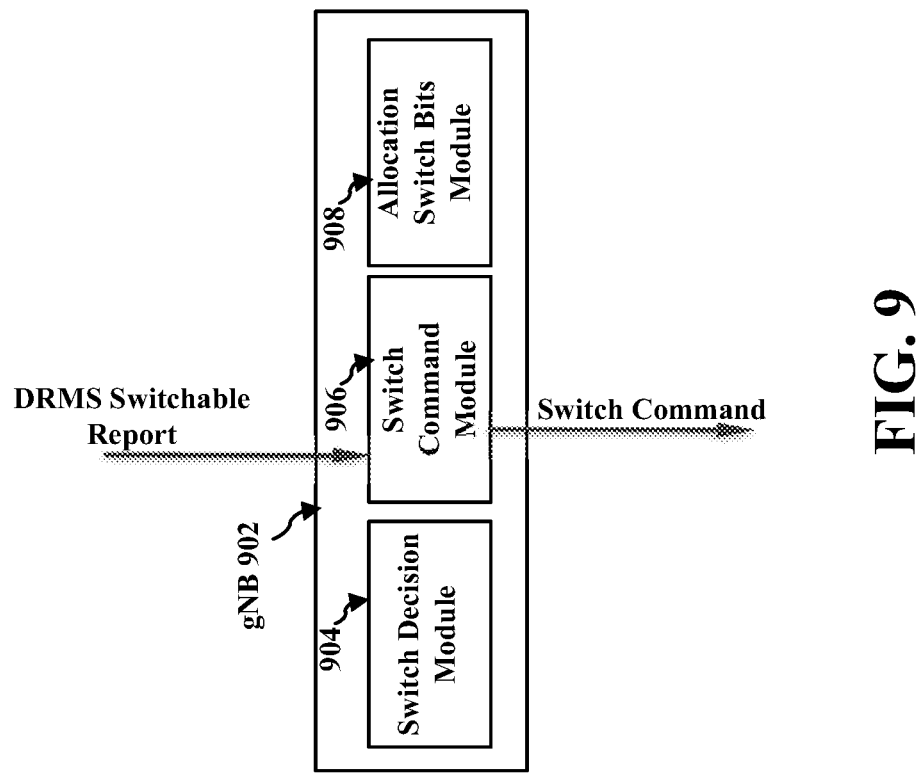
FIG. 9 is a diagram illustrating an example gNB.

With reference to FIG. 9, a diagram illustrating an example gNB 902 is shown. GNB 902 includes a switch decision module 904, a switch command module 906, and an allocation switch bits module 908. Switch command module 906 can receive DMRS switchable reports from any UEs 702C (shown in FIG. 7) that are capable of switching between using DMRS 15 and DMRS 18 configurations (DMRS R15 configuration 704 and DMRS R18 configuration 706 shown in FIG. 7).

Switch decision module 904 monitors network conditions to determine whether network operation would be optimized using DMRS 15 or DMRS 18 as the DMRS pattern. For example, switch decision module 904 can monitor loading and/or channel conditions. Other network conditions that can be monitored include frequency-selectivity and received signal strength. If switch decision module 904 determines that a switch from the current DMRS pattern used would improve network conditions, a switch command is sent to the UEs 702C that are capable of switching DMRS configurations.

The switch command can be provided with DCI sent by gNB 902 to UEs 702C. Allocation switch bits module 908 handles allocation of bits in the DCI for sending the switch command. Allocation switch bits module 908 can allocate bits in DCI during RRC configuration.

Some examples of allocation of bits in DCI during RRC configuration include an RRC message that indicates the following:

For uplink resource allocation: N bits are added to DCI Format 0_0 or Format 0_1. These N bits indicate which frequency domain (FD)-orthogonal cover code (OCC) length is used. (In 5G NR, R15 DMRS has length 2 FD-OCC, while R18 DMRS has length 4 FD-OCC).

For downlink resource allocation: N bits are added to DCI Format 1_0 or Format 1_1. These N bits indicate which FD-OCC length is used. (In 5G NR, R15 DMRS has length 2 FD-OCC, while R18 DMRS has length 4 FD-OCC).

In one or more embodiments, the switch command can further indicate DMRS pattern type and FD-OCC length. In this way, the switch command could indicate that the type to which a switch is requested is type 1 DMRS or type 2 DMRS, and the length to which the switch is requested is length-2 FD-OCC (for R15 DMRS) or length-4 FD-OCC (for R18 DMRS). Switch command could include two bits, for example, to indicate this information.

In one or more embodiments, switch decision module 904 decides whether to switch the DMRS pattern used for both uplink and downlink channels based on the network conditions monitored. In this case, the switch command informs each UE 702C to switch the DMRS configurations used for both uplink and downlink channels. In this way, the uplink and downlink channels always use the same DMRS pattern.

In one or more embodiments, switch decision module 904 decides separately whether to switch the DMRS pattern for each of the uplink and downlink channels based on the network conditions monitored. (It is noted that in 5G NR, uplink and downlink DMRS patterns are indicated separately since different DCIs are used for uplink vs. downlink configurations, which makes it possible decide DMRS patterns separately for uplink and downlink channels.) In this case, the switch command informs each UE 702C to switch the DMRS configuration for only one of the uplink and downlink channels or for both of the uplink and downlink channels. In this way, the uplink and downlink channels can use the same or different DMRS patterns.

GNB 902 can be handling multiple UEs, including one or more of any of UEs 702A, 702B, and 702C. DMRS switchable reports would be received only from UEs 702C, and switch commands would be sent only to UEs 702C.

Figure 10:
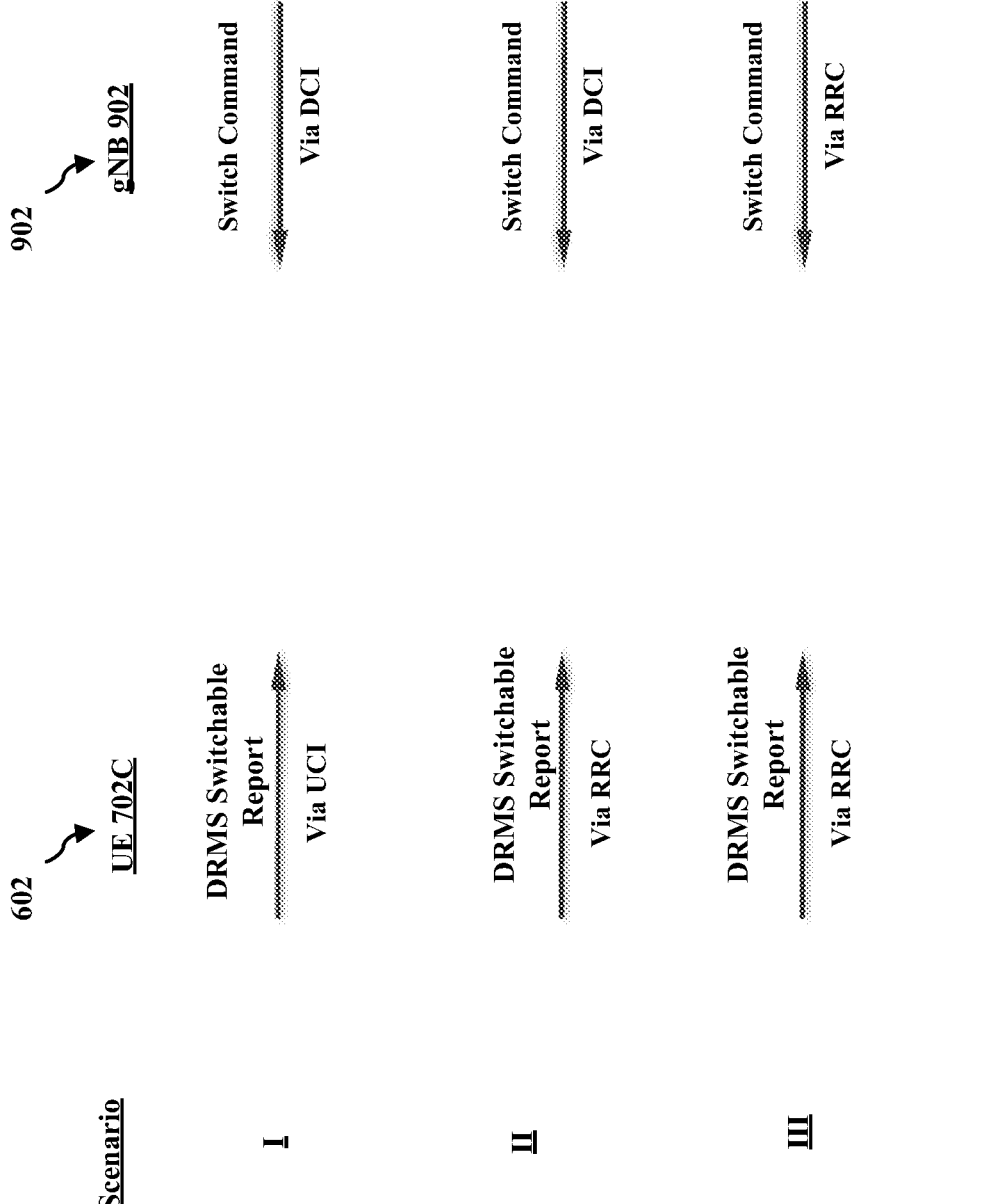
FIG. 10 is a diagram illustrating several different scenarios for UE transmission of DMRS switching capability reports and gNB transmission of switching commands.

FIG. 10 is a diagram illustrating several different example scenarios for UE transmission of DMRS switchable reports and gNB transmission of switch commands. In scenario I, UE 702C sends a DMRS switchable report to gNB 902 during the RRC in an RRC reconfiguration message to indicate its capability to switch DMRS patterns. Based on this DMRS switchable report, gNB 902 allocates extra bits on DCI (with different formats for uplink and downlink, in some embodiments). Those allocated DCI bits are later used by gNB 902 to configure the DMRS pattern to be used, either in DL or UL. In each of the scenarios shown, the DMRS switchable report can be sent each time communication is set up with a new gNB 902, such upon power-up of the UE 702C or performance of a handover operation. Returning to description of scenario I, upon deciding to switch between DMRS patterns (from DMRS R15 to DMRS R18 or from DMRS R18 to DMRS R15), gNB 902 sends a switch command via DCI using PDCCH.

In scenario II in accordance with one or more embodiments, UE 702C transmits a DMRS switchable report to gNB 902 using RRC. Upon deciding to switch between DMRS patterns (from DMRS R15 to DMRS R18 or from DMRS R18 to DMRS R15), gNB 902 sends a switch command via DCI using PDCCH.

In scenario III in accordance with one or more embodiments, UE 702C transmits a DMRS switchable report to gNB 902 using RRC that announces it is R18 capable and has a capability of switching between DMRS patterns (from DMRS R15 to DMRS R18 or from DMRS R18 to DMRS R15. Actual switching can be performed via RRC, but this is a slower process than switching via DCI.

Since the frequency of RRC is slow compared to DCI, scenarios I and II provide a potential advantage over scenario III by allowing gNB 902 to quickly react to network conditions by quickly sending a switch command in DCI. This enables UEs 702C to respond immediately to the switch command received by DCI by switching to use a different DMRS pattern.

FIG. 11 is a flow chart 1100 of a method (process) of wireless communication. The method may be performed by a UE (e.g., the UE 702C). Optionally, at operation 1102, the UE reports to a gNB (e.g., gNB 902) that the UE supports dynamic DMRS switching before receiving any DCI from the gNB. At operation 1104, the UE receives DCI receiving a message having DMRS switching bits that indicate which DMRS pattern is being used of either of a first DMRS pattern or a second DMRS pattern. At operation 1106, the UE determines the DMRS pattern being used from the DMRS switching bits. At operation 1108, the UE applies the determined DMRS pattern being used to processing of uplink and downlink channels. Optionally, at operation 1110, the UE determines that a handover has transpired to a new gNB. Optionally, at operation 112, the UE reports to the new gNB that the UE supports dynamic DMRS switching.

In certain configurations, the first DMRS pattern has a first length FD-OCC and the second DMRS pattern has a second length FD-OCC that is different than the first length FD-OCC. In certain configurations, the first DMRS pattern is R15 DMRS with length-2 FD-OCC, and the second DMRS pattern is R18 DMRS with length-4 FD-OCC. In certain configurations, the DMRS switching bits include one or more uplink bits that indicate an uplink DMRS pattern used for the uplink channel and one or more downlink bits that indicate a downlink DMRS pattern used for the downlink channel, and the determining the DMRS pattern includes determining each of the uplink DMRS pattern and the downlink DMRS pattern from the DMRS switching bits, and applying the determined DMRS pattern includes applying the determined uplink DMRS pattern to the uplink channel and the determined downlink DMRS pattern to the downlink channel, wherein the uplink DMRS pattern and downlink DMRS pattern are be different. In certain configurations, the DMRS switching bits are allocated in DCI and the message having the DMRS switching bits is received via the DCI from a gNB. In certain configurations, the DMRS switching bits are allocated in RRC information and the message having the DMRS switching bits is received via the RRC information. In certain configurations, the reporting is performed using RRC.

Figure 12:
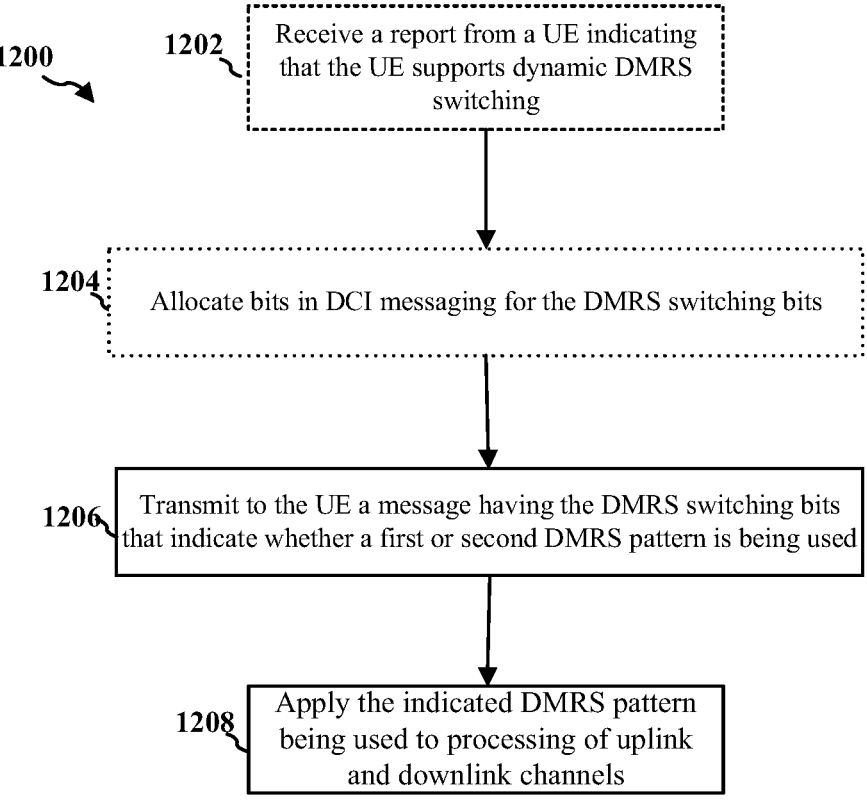
FIG. 12 is a flow chart of another method (process) for wireless communication performed by a gNB.

FIG. 12 is a flow chart 1200 of a method (process) of wireless communication. The method may be performed by a gNB (e.g., the gNB 902). Optionally, at operation 1202, the gNB receives a report from a UE (e.g., UE 702C) indicating that the UE supports dynamic DMRS switching. Optionally, at operation 1204, the gNB allocates bits in DCI messaging for the DMRS switching bits. At operation 1206, the gNB transmits to the UE a message having the DMRS switching bits that indicate whether a first or second DMRS pattern is being used. At operation 1208, the gNB applies the indicated DMRS pattern being used to processing of uplink and downlink channels.

In certain configurations, the message having the DMRS switching bits is only sent to the UE after receiving the report. In certain configurations, the first DMRS pattern has a first length FD-OCC and the second DMRS pattern has a second length frequency domain (FD)-orthogonal cover code (OCC) that is different than the first length FD-OCC. In certain configurations, the first DMRS pattern is R15 DMRS with length-2 FD-OCC and the second DMRS pattern is R18 DMRS with length-4 FD-OCC. In certain configurations, the DMRS switching bits include one or more uplink bits that indicate an uplink DMRS pattern used for the uplink channel and one or more downlink bits that indicate a downlink DMRS pattern used for the downlink channel, and the determining the DMRS pattern includes determining each of the uplink DMRS pattern and the downlink DMRS pattern from the DMRS switching bits, and applying the determined DMRS pattern includes applying the determined uplink DMRS pattern to the uplink channel and the determined downlink DMRS pattern to the downlink channel, wherein the uplink DMRS pattern and downlink DMRS pattern are be different.

In certain configurations, the network conditions include network loading and channel conditions and the evaluation includes optimization network performance based on the network conditions. In certain conditions, the report is received via a RRC communication.

In certain configurations, the DMRS switching bits are transmitted via DCI when they are sent. In certain configurations, the DMRS switching bits are transmitted via RRC when they are sent.

Figure 13:
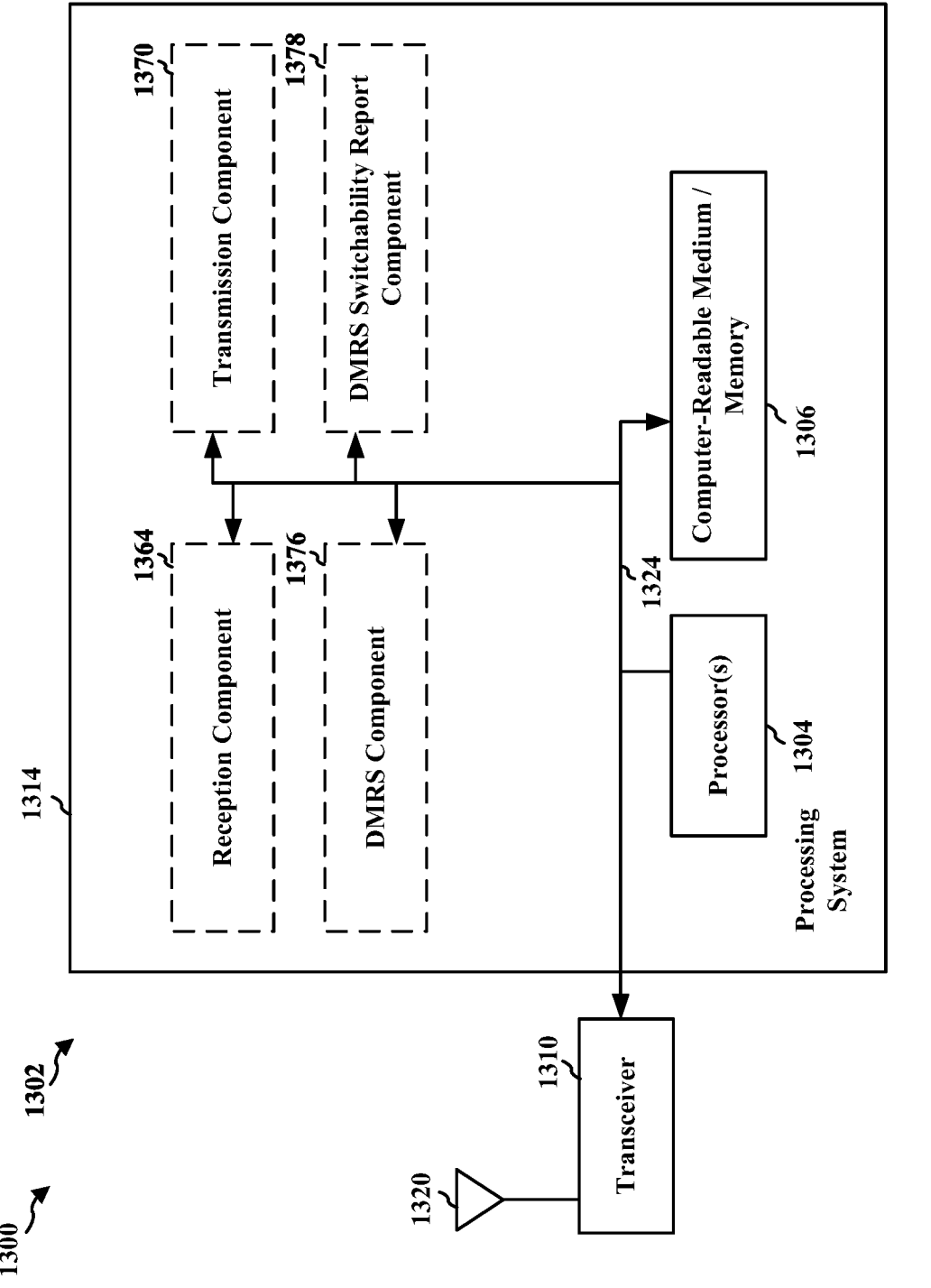
FIG. 13 is a diagram illustrating an example of a hardware implementation for an apparatus employing a processing system.

FIG. 13 is a diagram 1300 illustrating an example of a hardware implementation for an apparatus 1302 employing a processing system 1314. The apparatus 1302 may be a UE. The processing system 1314 may be implemented with a bus architecture, represented generally by a bus 1324. The bus 1324 may include any number of interconnecting buses and bridges depending on the specific application of the processing system 1314 and the overall design constraints. The bus 1324 links together various circuits including one or more processors and/or hardware components, represented by one or more processors 1304, a reception component 1364, a transmission component 1370, a DMRS component 1376, a DMRS switch capability report component 1378, and a computer-readable medium/memory 1306. The bus 1324 may also link various other circuits such as timing sources, peripherals, voltage regulators, and power management circuits, etc.

The processing system 1314 may be coupled to a transceiver 1310, which may be one or more of the transceivers 254. The transceiver 1310 is coupled to one or more antennas 1320, which may be the communication antennas 252.

The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1364. In addition, the transceiver 1310 receives information from the processing system 1314, specifically the transmission component 1370, and based on the received information, generates a signal to be applied to the one or more antennas 1320.

The processing system 1314 includes one or more processors 1304 coupled to a computer-readable medium/memory 1306. The one or more processors 1304 are responsible for general processing, including the execution of software stored on the computer-readable medium/memory 1306. The software, when executed by the one or more processors 1304, causes the processing system 1314 to perform the various functions described supra for any particular apparatus. The computer-readable medium/memory 1306 may also be used for storing data that is manipulated by the one or more processors 1304 when executing software. The processing system 1314 further includes at least one of the reception component 1364, the transmission component 1370, the DMRS component 1376, and the DMRS switch capability report component 1378. The components may be software components running in the one or more processors 1304, resident/stored in the computer readable medium/memory 1306, one or more hardware components coupled to the one or more processors 1304, or some combination thereof. The processing system 1314 may be a component of the UE 250 and may include the memory 260 and/or at least one of the TX processor 268, the RX processor 256, and the communication processor 259.

In one configuration, the apparatus 1302 for wireless communication includes means for performing each of the operations of FIG. 11. The aforementioned means may be one or more of the aforementioned components of the apparatus 1302 and/or the processing system 1314 of the apparatus 1302 configured to perform the functions recited by the aforementioned means.

As described supra, the processing system 1314 may include the TX Processor 268, the RX Processor 256, and the communication processor 259. As such, in one configuration, the aforementioned means may be the TX Processor 268, the RX Processor 256, and the communication processor 259 configured to perform the functions recited by the aforementioned means.

Figure 14:
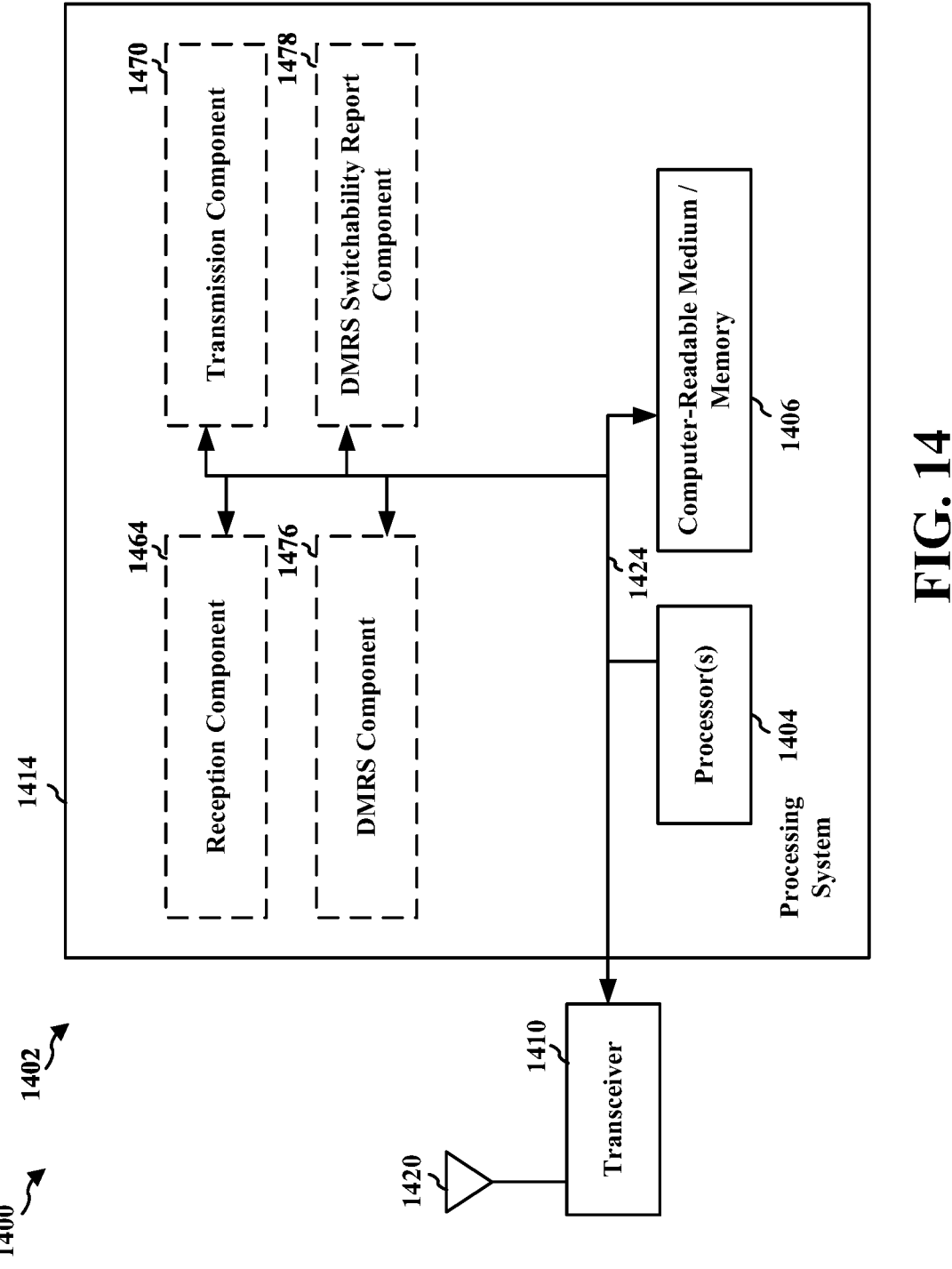
FIG. 14 is a diagram illustrating an example of a hardware implementation for another apparatus employing a processing system.

FIG. 14 is a diagram 1400 illustrating an example of a hardware implementation for an apparatus 1402 employing a processing system 1414. The apparatus 1402 may be a gNB. The processing system 1414 may be implemented with a bus architecture, represented generally by a bus 1424. The bus 1424 may include any number of interconnecting buses and bridges depending on the specific application of the processing system 1414 and the overall design constraints. The bus 1424 links together various circuits including one or more processors and/or hardware components, represented by one or more processors 1404, a reception component 1464, a transmission component 1470, a DMRS component 1476, a DMRS switch capability report component 1478, and a computer-readable medium/memory 1406. The bus 1424 may also link various other circuits such as timing sources, peripherals, voltage regulators, and power management circuits, etc.

The processing system 1414 may be coupled to a transceiver 1410, which may be one or more of the transceivers 254. The transceiver 1410 is coupled to one or more antennas 1420, which may be the communication antennas 220.

The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1464. In addition, the transceiver 1410 receives information from the processing system 1414, specifically the transmission component 1470, and based on the received information, generates a signal to be applied to the one or more antennas 1420.

The processing system 1414 includes one or more processors 1404 coupled to a computer-readable medium/memory 1406. The one or more processors 1404 are responsible for general processing, including the execution of software stored on the computer-readable medium/memory 1406. The software, when executed by the one or more processors 1404, causes the processing system 1414 to perform the various functions described supra for any particular apparatus. The computer-readable medium/memory 1406 may also be used for storing data that is manipulated by the one or more processors 1404 when executing software. The processing system 1414 further includes at least one of the reception component 1464, the transmission component 1470, the DMRS component 1476, and the DMRS switch capability report component 1478. The components may be software components running in the one or more processors 1404, resident/stored in the computer readable medium/memory 1406, one or more hardware components coupled to the one or more processors 1404, or some combination thereof. The processing system 1414 may be a component of the base station 210 and may include the memory 276 and/or at least one of the TX processor 216, the RX processor 270, and the controller/processor 275.

In one configuration, the apparatus 1402 for wireless communication includes means for performing each of the operations of FIG. 12. The aforementioned means may be one or more of the aforementioned components of the apparatus 1402 and/or the processing system 1414 of the apparatus 1402 configured to perform the functions recited by the aforementioned means.

As described supra, the processing system 1414 may include the TX Processor 216, the RX Processor 270, and the controller/processor 275. As such, in one configuration, the aforementioned means may be the TX Processor 216, the RX Processor 270, and the controller/processor 275 configured to perform the functions recited by the aforementioned means. It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication performed by a user equipment (UE), the method comprising:
   receiving a message having Demodulation Reference Signal (DMRS) switching bits that indicate which DMRS pattern is to be used of either of a first DMRS pattern or a second DMRS pattern, wherein the first DMRS pattern supports a first maximum number of orthogonal DMRS ports and provides a first channel estimation performance, wherein the second DMRS pattern supports a second maximum number of orthogonal DMRS ports that is greater than the first maximum number and provides a second channel estimation performance that is degraded relative to the first channel estimation performance, and wherein the DMRS switching bits indicate switching from the second DMRS pattern to the first DMRS pattern when network loading decreases to improve link quality;
   determining the DMRS pattern to be used from the DMRS switching bits; and
   applying the determined DMRS pattern to processing of uplink and downlink channels.

2. The method of claim 1, wherein the first DMRS pattern has a first length frequency domain (FD)-orthogonal cover code (OCC) and the second DMRS pattern has a second length frequency domain FD-OCC that is different than the first length FD-OCC.

3. The method of claim 1, wherein the first DMRS pattern is R15 DMRS with length-2 FD-OCC and the second DMRS pattern is R18 DMRS with length-4 FD-OCC.

4. The method of claim 1, wherein the DMRS switching bits include one or more uplink bits that indicate an uplink DMRS pattern used for the uplink channel and one or more downlink bits that indicate a downlink DMRS pattern used for the downlink channel, and the determining the DMRS pattern includes determining each of the uplink DMRS pattern and the downlink DMRS pattern from the DMRS switching bits, and applying the determined DMRS pattern includes applying the determined uplink DMRS pattern to the uplink channel and the determined downlink DMRS pattern to the downlink channel, wherein the uplink DMRS pattern and downlink DMRS pattern are be different.

5. The method of claim 1, further comprising reporting to a gNodeB (gNB) that the UE supports dynamic DMRS switching before receiving any Downlink Control Information (DCI) from the gNB.

6. The method of claim 5, further comprising:

determining that a handover has transpired to a new gNB;

reporting to the new gNB that the UE supports dynamic DMRS switching.

7. The method of claim 5, wherein the reporting is performed using RRC.

8. The method of claim 1, wherein the DMRS switching bits are allocated in DCI and the message having the DMRS switching bits is received via the DCI from a gNB.

9. The method of claim 1, wherein the DMRS switching bits are allocated in Radio Resource Control (RRC) information and the message having the DMRS switching bits is received via the RRC information.

10. A method of wireless communication performed by a gNodeB (gNB), the method comprising:

transmitting to a user equipment (UE) a message having Demodulation Reference Signal (DMRS) switching bits that indicate which DMRS pattern is to be used of either of a first DMRS pattern or a second DMRS pattern, wherein the first DMRS pattern supports a first maximum number of orthogonal DMRS ports and provides a first channel estimation performance, wherein the second DMRS pattern supports a second maximum number of orthogonal DMRS ports that is greater than the first maximum number and provides a second channel estimation performance that is degraded relative to the first channel estimation performance, and wherein the DMRS switching bits indicate switching from the second DMRS pattern to the first DMRS pattern when network loading decreases to improve link quality; and applying the indicated DMRS pattern to processing of uplink and downlink channels.

11. The method of claim 10, wherein the first DMRS pattern as a first length FD-OCC and the second DMRS pattern has a second length frequency domain (FD)-orthogonal cover code (OCC) that is different than the first length FD-OCC.

12. The method of claim 10, wherein the first DMRS pattern is R15 DMRS with length-2 FD-OCC and the second DMRS pattern is R18 DMRS with length-4 FD-OCC.

13. The method of claim 10, wherein the DMRS switching bits include one or more uplink bits that indicate an uplink DMRS pattern used for the uplink channel and one or more downlink bits that indicate a downlink DMRS pattern used for the downlink channel, and applying the indicated DMRS pattern includes applying the indicated uplink DMRS pattern to the uplink channel and the indicated downlink DMRS pattern to the downlink channel, wherein the uplink DMRS pattern and downlink DMRS pattern are be different.

14. The method of claim 10, further comprising receiving a report from the UE indicating that the UE supports dynamic DMRS switching, and only sending the message having the DMRS switching bits to the UE after receiving the report.

15. The method of claim 14, wherein the report is received via a Radio Resource Control (RRC) communication.

16. The method of claim 14, wherein the method further includes allocating bits in DCI messaging for the DMRS switching bits, and wherein the DMRS switching bits are transmitted via DCI.

17. The method of claim 14, wherein the DMRS switching bits are transmitted via RRC.

18. The method of claim 10, further comprising:

evaluating network conditions;

deciding based on the evaluation whether to transmit to the user equipment (UE) the message with the DMRS switching bits for switching from a current DMRS pattern to a different DMRS pattern.

19. The method of claim 18, wherein the network conditions include network loading and channel conditions and the evaluation includes optimization network performance based on the network conditions.

20. An apparatus for wireless communication, the apparatus being a user equipment (UE), comprising:

a memory; and at least one processor coupled to the memory and configured to:

receive a message having Demodulation Reference Signal (DMRS) switching bits that indicate which DMRS pattern is to be used of either of a first DMRS pattern or a second DMRS pattern, wherein the first DMRS pattern supports a first maximum number of orthogonal DMRS ports and provides a first channel estimation performance, wherein the second DMRS pattern supports a second maximum number of orthogonal DMRS ports that is greater than the first maximum number and provides a second channel estimation performance that is degraded relative to the first channel estimation performance, and wherein the DMRS switching bits indicate switching from the second DMRS pattern to the first DMRS pattern when network loading decreases to improve link quality;

determine the DMRS pattern to be used from the DMRS switching bits; and apply the determined DMRS pattern to processing of uplink and downlink channels.

* * * * *